(No Model.)

G. W. LONGMAN.
DRILLING MACHINE.

No. 254,031. Patented Feb. 21, 1882.

Witnesses
Richard A. Heaty
Kittie Inglis

Inventor
George W. Longman
John Inglis atty

UNITED STATES PATENT OFFICE.

GEORGE W. LONGMAN, OF PATERSON, NEW JERSEY.

DRILLING-MACHINE.

SPECIFICATION forming part of Letters Patent No. 254,031, dated February 21, 1882.

Application filed November 2, 1881. (No model.)

*To all whom it may concern:*

Be it known that I, GEORGE W. LONGMAN, a citizen of the United States, residing at Paterson, Passaic county, State of New Jersey, have invented a new and useful Improvement in Portable Tapping and Drilling Devices, of which the following is a specification, reference being had to the accompanying drawings, forming a part thereof.

My invention relates to devices for tapping and drilling of holes in boilers, &c., and has for its object the production of a portable device to be driven either by hand or power to drill holes in metal and tap the same perpendicularly, horizontally, or at any desired angle.

Figure 1:
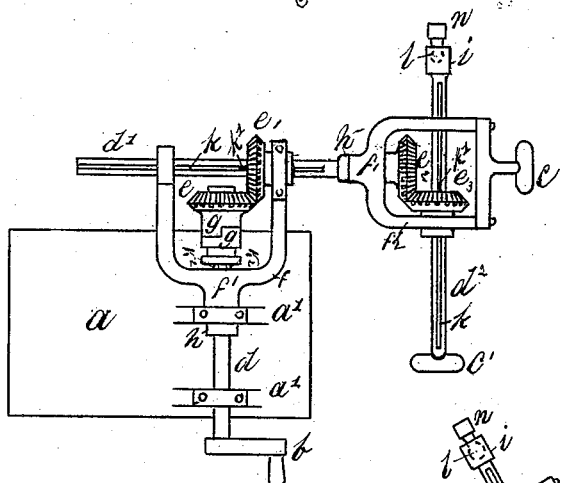
Figure 2:
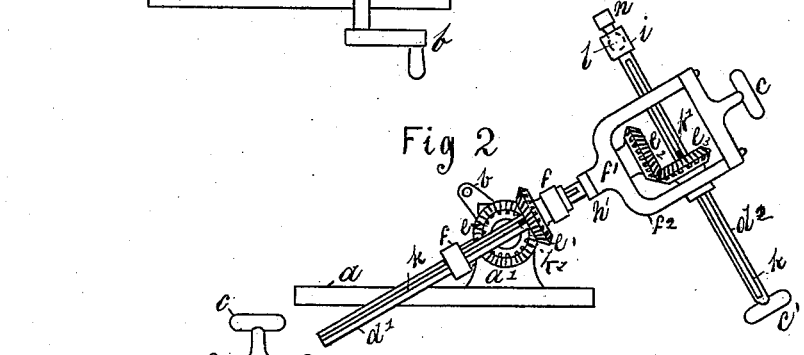
Figure 3:
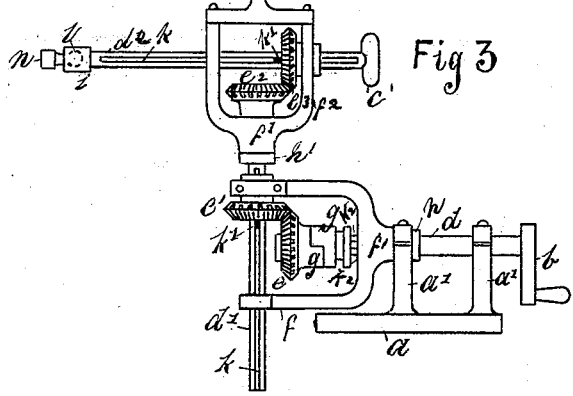

Figure 1 is a plan view of my newly-invented tapping device, showing it horizontally. Fig. 2 is a side view of the same at an angle; and Fig. 3 is an end view of the same, arranged perpendicularly.

$a$ represents a bed-plate, to which are secured suitable bearings arranged in standards $a'$ $a'$, into which bearings there are journaled a driving-shaft, $d$, and an adjustable frame, $f$, having a sleeve, $f'$, into which sleeve one end of the shaft $d$ is journaled. On the outer end of the shaft $d$ there is arranged a crank, $b$, to operate the device when the same is worked by hand, or a driving-pulley when operated by power. The inner end of the shaft is provided with a beveled-gear wheel, $e$, that gears with a like gear-wheel, $e'$, located on a driving-spindle, $d'$, that is journaled in the adjustable frame $f$. The driving-spindle $d'$ is also provided with a channeled gear-wheel, $e^2$, and an adjustable frame, $f^2$, having a sleeve, $f'$, that works in the channel of the wheel $e^2$, and is kept in position by a collar, $h'$. Journaled in one of the forks of the adjustable frame $f^2$ is a channeled gear-wheel, $e^3$, through which and in which there is journaled a grooved tap or drill spindle, $d^2$, having on one end a collar, $i$, in which there is a socket, $l$, into which socket works a chuck, $n$. The wheels $e'$ and $e^3$ are provided with suitable feathers, $k'$, that work in the grooves $k$ of the spindles $d'$ and $d^2$.

Operation: Motion is given to the driving-shaft $d$ at $b$. The beveled-gear wheel $e$, that is secured to the end of the shaft $d$, engages with the gear-wheel $e'$, located on the driving-spindle $d'$, and rotates the same. The beveled-gear wheel $e^2$, on the end of the driving-spindle $d'$, engages with a like gear-wheel, $e^3$, on the tap or drill spindle $d^2$, and rotates the same. The driving-spindle $d'$ and the drill or tap spindle $d^2$ may be operated through the sleeves of the gear-wheels $e'$ and $e^3$, while the same are rotating, by means of the operating-handles $c$ $c'$. The feathers $k'$, working in the grooves $k$, serve to keep the spindles $d'$ $d^2$ fast for rotating purposes. The adjustable frames $f$ $f^2$, rotating in the channels of the wheels $e^2$ $e^3$, and standard $a'$, admit of the spindle $d^2$ being presented in a perpendicular, horizontal, or angular position, as shown in Figs. 1, 2, and 3. The handles $c$ $c'$ turn on the spindle $d^2$ and adjustable frame $f^2$, so as to offer no obstructions to the rotation of the same. The drill or tap in the chuck $n$ may be thrown on an angle by reason of the socket and ball working therein.

When the device is to be operated by power a portable steam-engine may be located on the bed-plate $a$ and the bed-plate provided with wheels to form the same into a truck for moving the device from place to place where the same is required.

The driving-spindle $d'$ may be made of any suitable length for practical purposes.

The clutch $g$, working on feathers $k^2$ in the shaft $d$, may be operated by any known clutch-shifting device for throwing the drill in and out of gear when the device is to be stopped or started.

Having described my newly-invented tapping and drilling device, what I claim, and desire to secure by Letters Patent, is—

The combination of the driving-shaft $d$, adjustable frame $f$, sleeves $f'$, gear-wheels $e$ $e'$, collars $h$, clutch $g$, feathers $k^2$, standards $a'$, driving-spindle $d'$, provided with a groove, $k$, feathers $k'$, adjustable frame $f^2$, gear-wheels $e^2$ $e^3$, spindle $d^2$, having groove $k$, collar $i$, socket $l$, chuck $n$, operating-handles $c$ $c'$, bed-plate $a$, and crank $b$, all arranged as shown, operating as and for the purposes set forth.

GEORGE W. LONGMAN.

Witnesses:
KITTIE INGLIS,
JOHN INGLIS.